United States Patent [19]

Ikemura et al.

[11] Patent Number: 4,625,628
[45] Date of Patent: Dec. 2, 1986

[54] COMBINED WALL AND VENTILATOR MODULE FOR A BUILDING

[75] Inventors: Akio Ikemura, Kurobe; Minoru Kajiki, Toyama, both of Japan

[73] Assignee: Yoshida Kogyo K.K., Tokyo, Japan

[21] Appl. No.: 842,061

[22] Filed: Mar. 13, 1986

Related U.S. Application Data

[63] Continuation of Ser. No. 716,550, Mar. 27, 1985, abandoned.

[51] Int. Cl.[4] .............................................. F24F 13/00
[52] U.S. Cl. ......................................... 98/32; 165/54; 98/33.1; 98/38.2
[58] Field of Search .................... 98/31, 32, 31.6, 33.1, 98/38.2; 165/54

[56] References Cited

U.S. PATENT DOCUMENTS

| | | | |
|---|---|---|---|
| 780,385 | 1/1905 | Siebert | 98/32 |
| 3,509,834 | 5/1970 | Rosenberg et al. | 110/254 |
| 3,789,747 | 2/1974 | Wasserman et al. | 98/32 |
| 4,072,187 | 2/1978 | Lodge | 165/54 |
| 4,377,201 | 3/1983 | Kruse et al. | 165/54 |
| 4,377,400 | 3/1983 | Okamoto et al. | 165/54 |

FOREIGN PATENT DOCUMENTS

| | | | |
|---|---|---|---|
| 3208392 | 9/1983 | Fed. Rep. of Germany | 98/32 |
| 58-55637 | 4/1983 | Japan | 98/32 |
| 58-160752 | 9/1983 | Japan | 98/33 R |

*Primary Examiner*—Henry C. Yuen
*Attorney, Agent, or Firm*—Hill, Van Santen, Steadman & Simpson

[57] ABSTRACT

A combined wall and ventilation module for a building, comprises a wall unit having a thermally insulated frame and a thermally insulated wall element mounted in the frame on the exterior side thereof, and a ventilator supported by the frame on the interior side thereof and having a heat-exhanging element disposed therein for effecting a heat exchange between fresh atmospheric air and consumed room air. The frame has within it at least one thermally insulated internal intake passage communicating at opposite ends with the ventilator and the outside atmosphere for introducing therethrough the fresh atmospheric air into the ventilator, and at least one thermally insulated internal discharge passage communicating at opposite ends with the ventilator and the outside atmosphere for discharging therethrough the consumed room air into the outside atmosphere. Each of the intake and discharge passages is covered with a layer of thermally insulating material extending over the inner peripheral surface of the passage.

1 Claim, 9 Drawing Figures

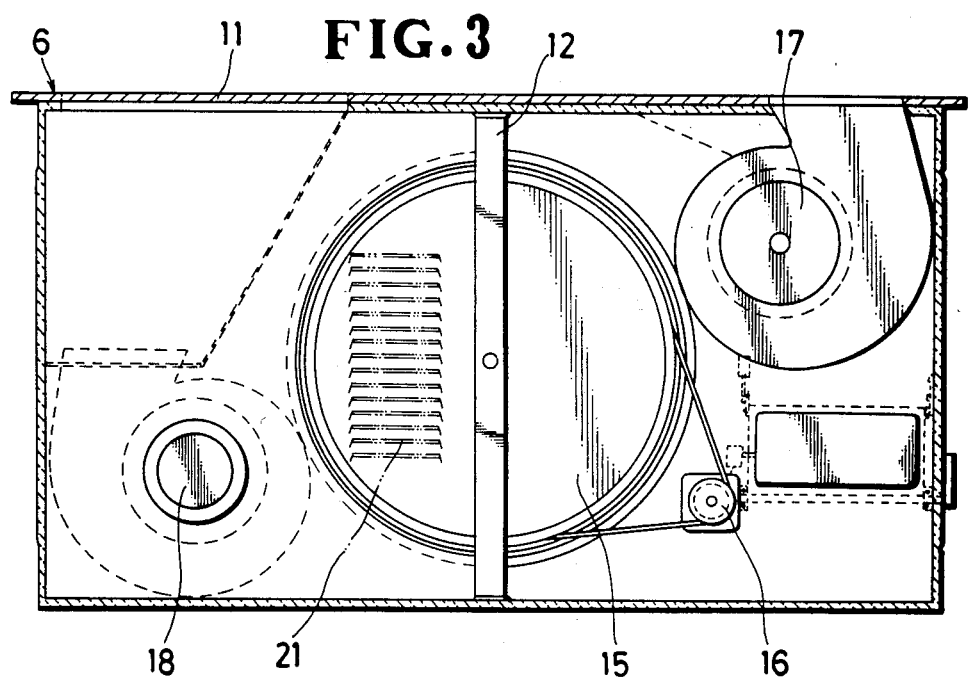
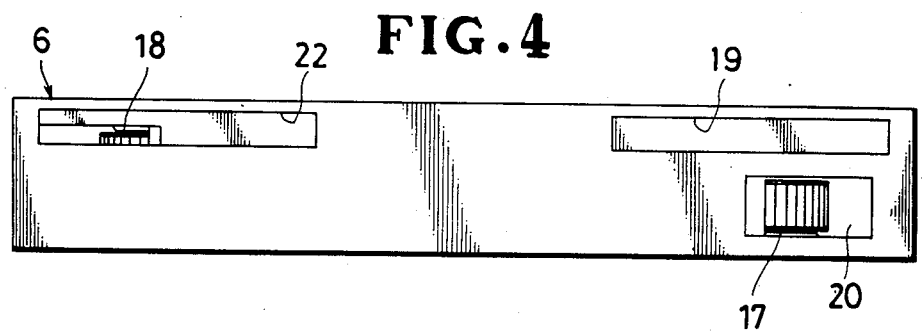
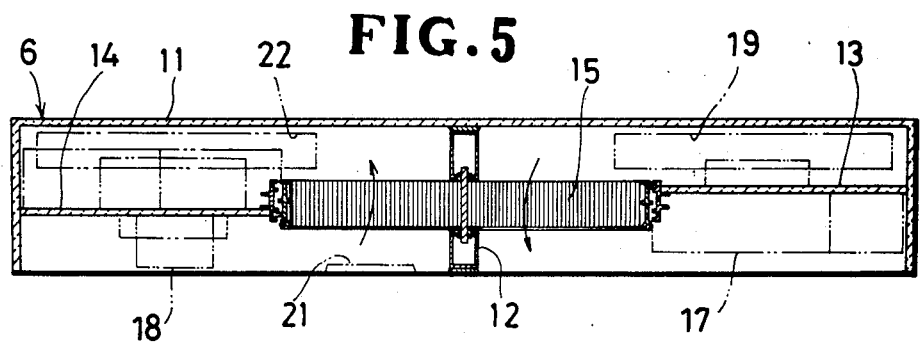

COMBINED WALL AND VENTILATOR MODULE FOR A BUILDING

This is a continuation of application Ser. No. 716,550, filed Mar. 27, 1985, now abandoned.

BACKGROUND OF THE INVENTION

1. Field of the Invention

The present invention relates to a combined wall and ventilator module for a house or building. More particularly, it relates to such module including a ventilator having a built-in heat exchanger which performs ventilation without affecting room conditions.

2. Prior Art

There are known combined wall and ventilator modules of the type described which include a thermally insulated wall fitted in an open rectangular frame on the room exterior side thereof and a ventilator mounted on the rectangular frame interiorly of the thermally insulated wall, the wall having within it air intake and discharge passages held in fluid communication with a heat-exchanging element of the ventilator. The air intake and discharge passages of the known modules comprise through-holes drilled in the wall. The thermally insulated wall having such drilled holes has an reduced mechanical strength, is defective from an aesthetic view, and gives an insufficient degree of thermal insulation.

SUMMARY OF THE INVENTION

It is therefore an object of the present invention to provide a combined wall and ventilator module for a building wherein a thermally insulated wall element has a sufficient mechanical strength, is neat in appearance, and gives a desired degree of thermal insulation.

According to the present invention, a combined wall and ventilation module for a building, comprises a wall unit having a thermally insulated frame and a thermally insulated wall element mounted in the frame on the exterior side thereof, and a ventilator supported by the frame on the interior side thereof and having a heat-exchanging element disposed therein for effecting a heat exchange between fresh atmospheric air and consumed room air. The frame has within it at least one thermally insulated internal intake passage communicating at opposite ends with the ventilator and the outside atmosphere for introducing therethrough the fresh atmospheric air into the ventilator, and at least one thermally insulated internal discharge passage communicating at opposite ends with the ventilator and the outside atmosphere for discharging therethrough the consumed room air into the outside atmosphere. Each of the intake and discharge passages is covered with a layer of thermally insulating material extending over the inner peripheral surface of the passage.

BRIEF DESCRIPTION OF THE DRAWINGS

FIG. 3 is an enlarged vertical cross-sectional view showing the interior of a ventilator of the combined building wall and ventilator module;

FIG. 4 is a plan view of the ventilator;

FIG. 5 is a horizontal cross-sectional view of the ventilator, with parts omitted for clarity;

DETAILED DESCRIPTION

Figure 1:
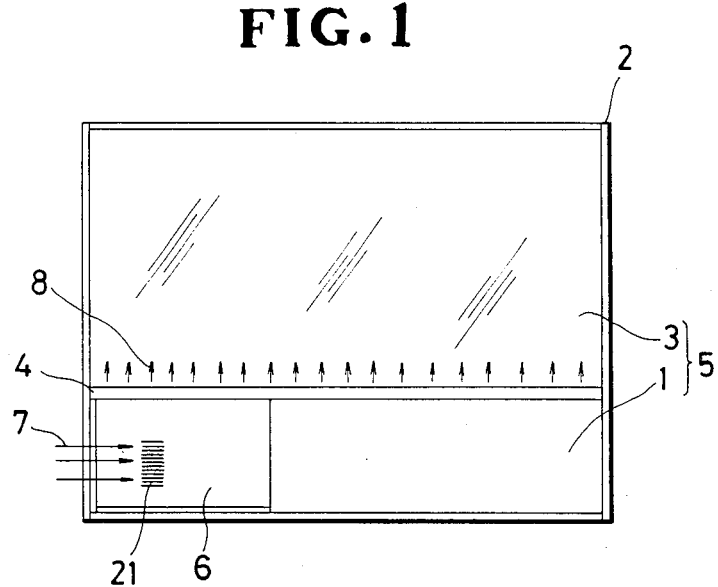
FIG. 1 is a schematic front elevational view of a combined building wall and ventilator module according to the present invention, the view showing the module as seen from the interior of a room.
Figure 2:
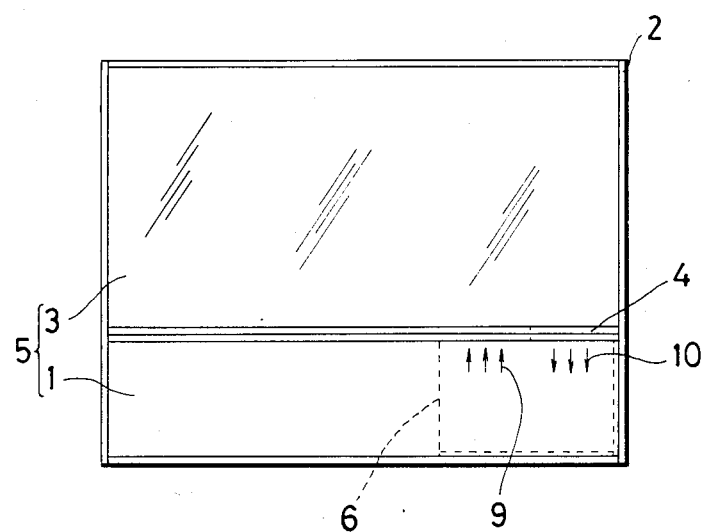
FIG. 2 is a view similar to FIG. 1, showing the combined building wall and ventilator module as seen from the exterior of the room.

Referring now to the drawing, wherein like reference characters designate identical or corresponding parts throughout the several views, and more particularly to FIGS. 1 and 2, there is shown a combined wall and ventilator module embodying the present invention.

The combined wall and ventilator module comprises an open rectangular window frame 2 mounted in an opening of a building (not shown). The window frame 2 is composed of extruded aluminum shapes or sections and has a transom or an intermediate horizontal frame member 4 extending between vertical frame members of the frame 2 to define a pair of upper and lower openings within the frames 2. The frame member 4 is positioned more closely to a bottom horizontal member of the frame 2 than to a top horizontal frame member. A pair of pans of glass 3, 3 is mounted within the upper opening on the room exterior side of the frame 2, and a thermally insulated panel 1 is mounted within the lower opening on the room exterior side of the frame 2. The glass pans 3, 3 and the thermally insulated panel 1 thus arranged jointly constitute a thermally insulated wall element 5 which constitutes jointly with the frame 2 a wall unit. Consumed room air is sucked into the ventilator 6 as indicated by the arrows 7 in FIG. 1 and then it is discharged downwardly from the intermediate horizontal frame member 4 as indicated by the arrows 10 in FIG. 2. Fresh atmospheric air is sucked upwardly from the frame member 4 into the ventilator 6 as indicated by the arrows 9 in FIG. 2 and then it is discharged upwardly from the frame member 4 as indicated by the arrows 8 in FIG. 1. The fresh atmospheric air and the consumed room air are brought into heat-exchange relationship as they flow through the ventilator 6.

The ventilator 6, as illustrated in FIGS. 3 through 5, includes a thermally insulated casing 11 having the shape of an elongated rectangular box. As shown in FIG. 3, the interior of the casing 11 is divided by means of a central hollow vertical partition wall 12 into left and right chambers each of which is subdivided by a side vertical partition wall 13, 14 into interior and exterior compartments. A heat-exchanging rotor 15 is rotatably mounted on the central partition wall 12 across the left and right chambers to face the interior and exterior compartments and is driven by a motor 16 (FIG. 3) via an endless belt to rotate at a relatively low velocity. The rotor 15 is of the type which is capable of exchanging both sensitive heat and latent heat at the same time.

The ventilator 6 also includes a blower or fan 17 mounted on the partition wall 13 for bringing air into the room interior, and a blower or fan 18 mounted on the partition wall 14 for discharging air outside the room. The casing 11 has a fresh atmospheric air inlet port 19, a fresh atmospheric air outlet port 20, a consumed room air inlet port 21, and a consumed room air outlet port 22. The ports 19–21 are defined in an upper wall of the casing 11 while the port 22 is defined in an interior side wall of the casing 11. With the ventilator 6 thus constructed, the fresh atmospheric air is introduced through the intack port 19 into the casing 11 and then flows through a right zone of the rotor 15. Then the fresh atmospheric air is discharged from the outlet port 20 into the room interior. Likewise, the consumed room air is introduced through the inlet port 21 into the casing 11 and then flows through a left zone of the rotor 15. Thereafter, the consumed room air is discharged from the outlet port 22 to the outer atmosphere. During the passage through the rotor 15, the fresh atmospheric air and the consumed room air exchange heat.

The fresh atmospheric air is introduced into the ventilator 6 through a fresh atmospheric air intake passage 23 (FIG. 6) while the consumed room air is discharged outside the room through a consumed room air discharge passage 24 (FIG. 7), the intake and discharge passages 23, 24 being defined in the intermediate horizontal frame member 4. As these passages 23, 24 have the same construction, only the air intake passage 23 is described below in detail.

Figure 6:
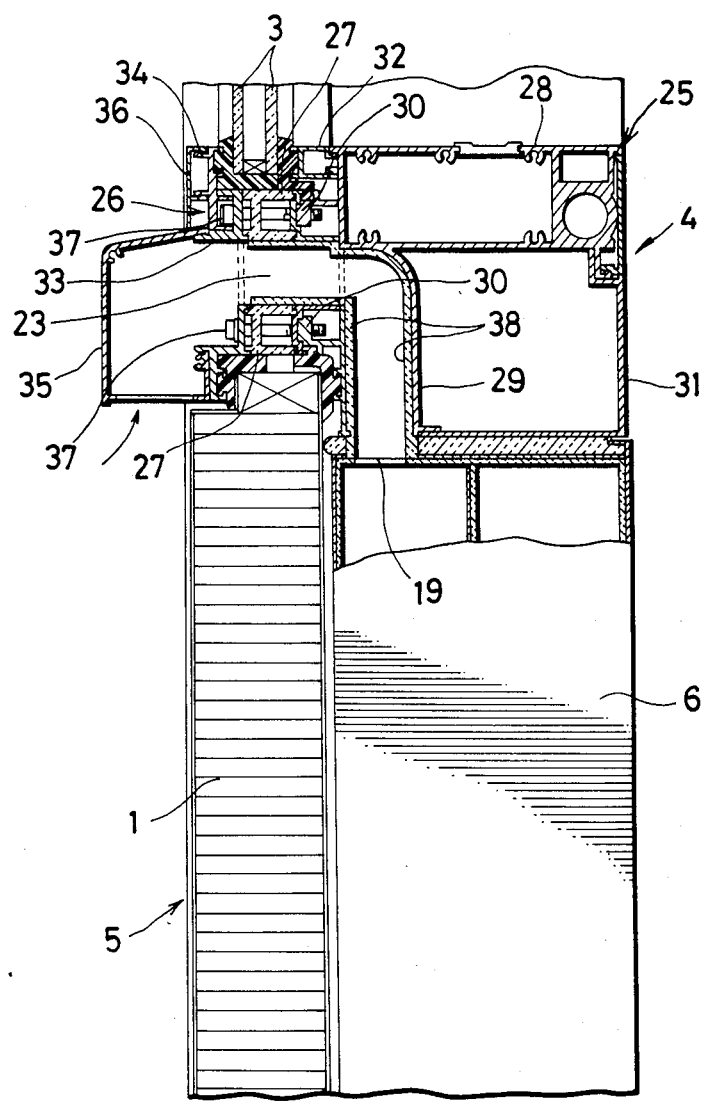
FIG. 6 is a fragmentary enlarged cross-sectional view showing a fresh atmospheric air intake passage in the combined wall and ventilator module.

As shown in FIG. 6, the intermediate horizontal frame member 4 has a thermally insulated construction and comprises a pair of interior and exterior frame pieces 25, 26 interconnected with connectors 27 interposed therebetween, the connectors 27 being made of a thermally insulating material. The interior frame piece 25 has a hollow rectangular cross-section and includes a hollow hoironztal portion 28, a hollow vertical portion 29 extending integrally downwardly from an exterior edge of the horizontal portion 28, a pair of L-shaped horizontal projections 30, 30 projecting exteriorly from the horizontal portion 28 and the vertical portion 29, respectively, and an L-shaped cover 31 secured to the horizontal and vertical portions 28, 29 to cover the interior side of the interior piece 25. A batten or outer horizontal frame member 32 is disposed above the upper projection 30 and secured to the interior frame piece 25. The exterior frame piece 26 includes an elongated web or body 33, an upward projection 34 secured to an upper portion of the body 33 in confronting relation to the batten 32, and a pair of upper and lower covers 36, 35 to cover the exterior side of the exterior frame piece 26. The upper cover 36 is secured to the upward projection 34 and the lower cover 35 is secured to the body 33. The lower cover 35 has a substantially C-shaped cross-section and projects exteriorly from the exterior surface of the thermally insulated panel 1. The upward projection 34 and the batten 32 jointly support therebetween the lower edges of the glass pans 3, 3 through gaskets. The body 33 is secured to the horizontal projections 30, 30 by means of a plurality of screws 37 with the thermally insulating connectors 27 sandwiched between the body 33 and the projection 30, 30. Although not shown, the top and bottom horizontal frame members and the vertical frame members have a thermally insulated construction and each include a pair of interior and exterior frame pieces interconnected with a thermally insulating connector interposed therebetween.

Figure 7:
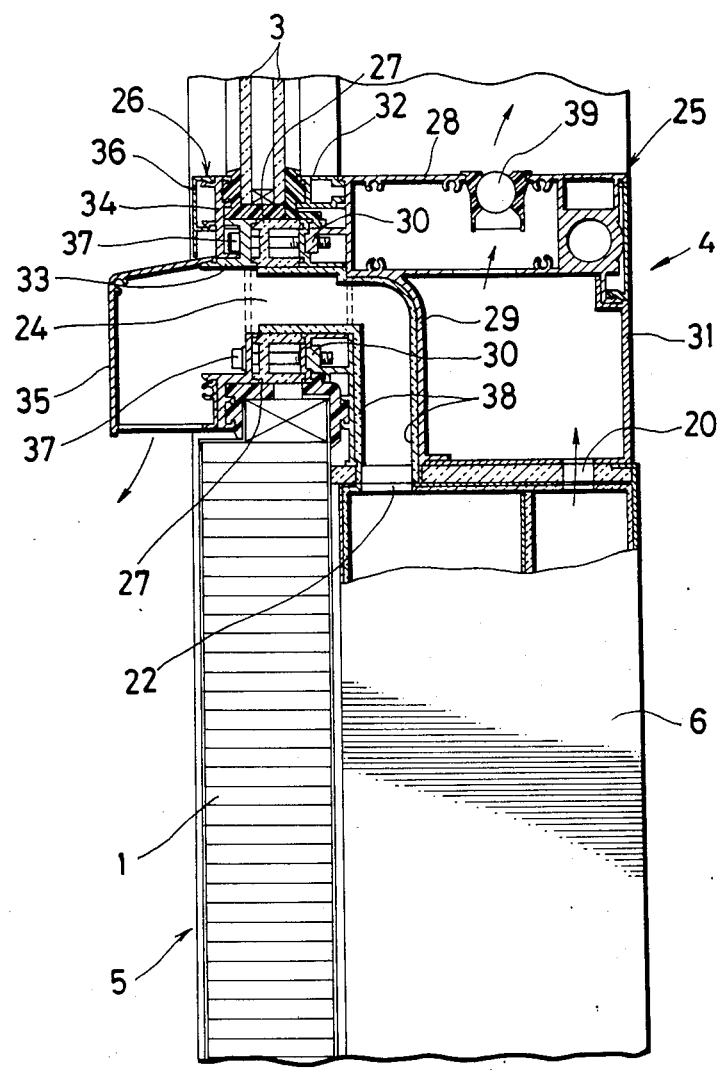
FIG. 7 is a view similar to FIG. 6, showing a consumed room air discharge passage.

To provide the fresh atmospheric air intake passage 23 shown in FIG. 6, a hole or opening is defined in a bottom wall of the lower cover 35, a pair of aligned holes or openings is defined, respectively, in the body 33 and an exteror wall of the hollow vertical portion 29, and a hole or opening is defined in a bottom wall of the vertical hollow portion 29 in registry with the fresh atmospheric air inlet port 19 of the ventilator 6. A series of such intake passages may be provided in which instance a partition wall (not shown) of thermally insulated material is disposed between each pair of adjacent holes. The intake passage 23 has a layer 38 of thermally insulating material provided over on the inner peripheral surface along the length thereof. More specifically, the thermally insulating layer 38 extends over the inner peripheral surface of the hollow vertical portion 29 and opposed surfaces of the connectors 27, 27. Through the intake passage 23 thus constructed, the fresh atmospheric air is introduced into the ventilator 6 and, after having been subjected to a heat exchanging relationship with the consumed room air in the rotor 15 (FIG. 5), it flows into the hollow interior of the interior frame 25 through the outlet port 20 (FIG. 7) and is finally discharged from an air discharge port 39 into the room. The air discharge port 39 is composed of an air diffuser as shown in FIG. 7.

Figure 8:
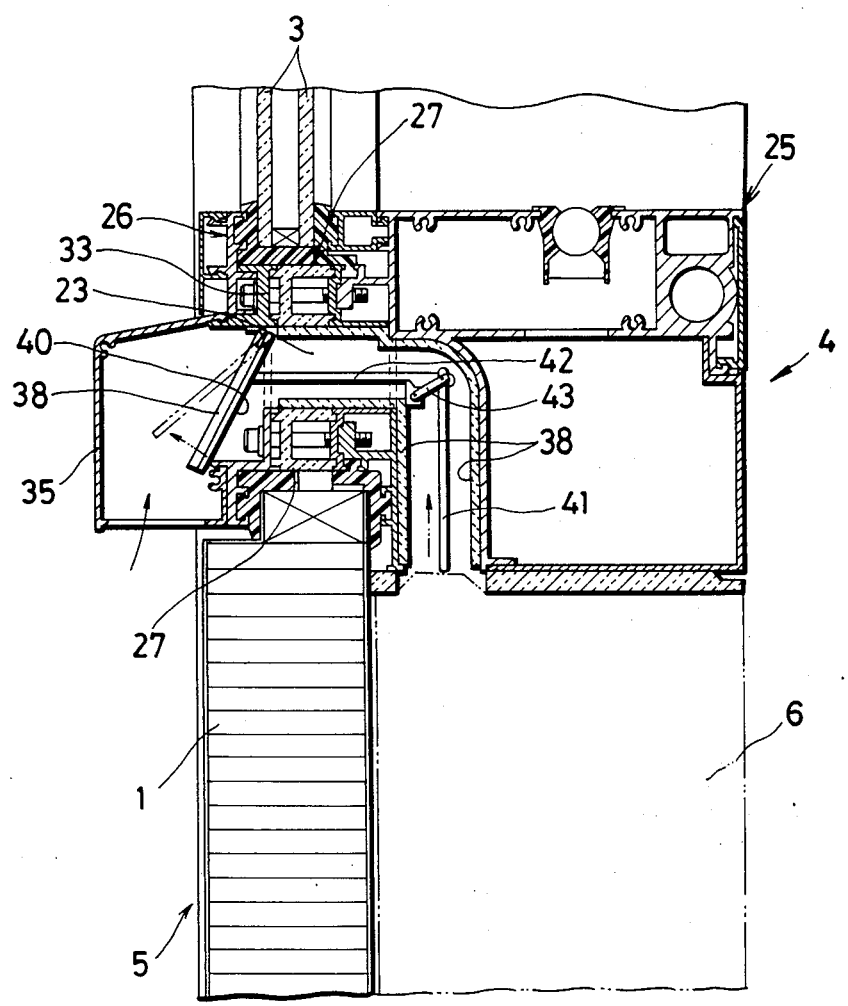
FIG. 8 is a view similar to FIG. 6, showing a modified air passage having a damper disposed therein.
Figure 9:
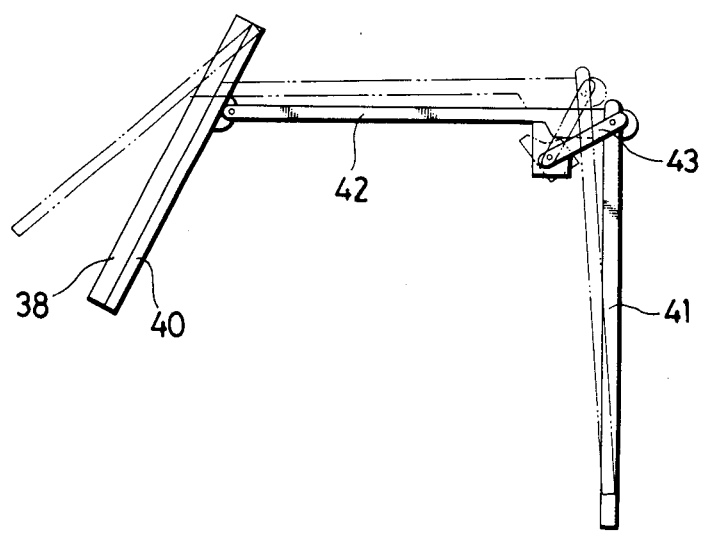
FIG. 9 is an enlarged side elevational view of the damper shown in FIG. 8.

As described above, the interior of the room communicates through the intake and discharge passages 23, 24 with the outer atmospheric air. In order to avoid air exchange when the ventilator is out of operation, there may be provided in these passages 23, 24 a pair of valves to open and shut the corresponding passages 23, 24. FIG. 8 shows one such valve provided in the fresh atmospheric air intake passage 23. The valve comprises a damper 40 pivotably connected to the body 33 of the exterior frame piece 26 and pivotable between a closing position indicated by solid lines and an opening position indicated by plantom lines. To actuate the damper 40, a vertical rod 41 and a horizontal rod 42 are disposed in the intake passage 23. The horizontal rod 42 is pivoted at one end to the damper 40 and at the opposite end to one end of the vertical rod 41. A link 43 is pivotably connected at one end to the pivot of the rods 41, 42 and at the opposite end to a portion of the interior frame piece 25. The other end of the vertical rod 41 is operatively connected to a suitable drive mechanism (not shown) disposed in the ventilator 6. A stopper block is pivoted to the other end of the link 43 and engages the horizontal rod 42 to prevent the latter from moving leftward in FIGS. 8 and 9 when the damper 40 is in the closing position. With the stopper thus arranged, accidental air change is avoidable even when the damper is forced to pivot in the opening direction without the agency of the rods 41, 42 and the link 43. The damper 40 may be coordinated with the electric system for the ventilator 6 so that it is forced automatically to take closing position when the supply of current to the motors of the fans 17, 18 or the motor 16 for the rotor 15 is interrupted. The damper 40 preferably has an exterior surface covered with a thermally insulating layer 40. As described above, the damper 40 may be disposed in the consumed room air discharge passage 24.

The combined wall and ventilator module of the present invention has various advantages: Since the fresh atmospheric air intake passage 23 and the consumed room air discharge passage 24 are defined in the thermally insulated frame member 4, the thermally insulated wall element 5 is free of hole or opening which would otherwise cause a substantial reduction in mechanical strength. Such opening-free wall element is neat in appearance. With the intake and discharge passages 23, 24 thermally insulated by the thermally insulated layer 38, the frame member 4 as a whole gives a desired degree of thermal insulation without forming dewdrops thereon.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A combined wall and ventilation module for a building, comprising:
   (a) a wall unit including a thermally insulated open rectangular window frame having a thermally insulated frame member, and further including a thermally insulated wall element mounted in said window frame on the exterior side thereof, said frame member including a pair of interconnected interior and exterior frame pieces made of extruded metallic sections, and thermally insulative connectors interposed between said interior and exterior frame pieces;
   (b) a ventilator supported by said window frame on the interior side thereof and having a heat-exhcanging element disposed therein for effecting a heat exchange between fresh atmospheric air and consumed room air, an inlet port for the passage of the fresh atmospheric air, and a discharge port for the passage of the consumed room air; and
   (c) said frame member having within it
      (1) at least one thermally insulated internal intake passage communicating at its one end with said inlet port and at the opposite end with the outside atmosphere for introducing therethrough the fresh atmospheric air into said ventilator, said intake passages being covered with a layer of thermally insulative material extending over the inner peripheral surface thereof,
      (2) at least one thermally insulated internal discharge passage communicating at its one end with said discharge port and at the other end with the outside atmosphere for discharging therethrough the consumed room air into the outside atmosphere, said discharge passages being covered with a layer of thermally insulative material extending over the inner peripheral surface thereof;
      (3) each of said thermally insulated intake and discharge passages being defined by at least a portion of said interior piece of extruded metal section; and
   (d) a damper movably disposed in each of said intake and discharge passage for opening and closing said passage, said damper having one surface covered with a layer of thermally insulative material.

* * * * *